United States Patent
Wang et al.

(10) Patent No.: US 9,456,353 B2
(45) Date of Patent: Sep. 27, 2016

(54) MULTI-BOARD ARCHITECTURE FOR WIRELESS TRANSCEIVER STATION

(71) Applicant: Alcatel-Lucent USA, Inc., Murray Hill, NJ (US)

(72) Inventors: Jerry Z. Wang, Marlboro, NJ (US); Emad Farag, Flanders, NJ (US); Susan M. Miller, Whitehouse Station, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 24 days.

(21) Appl. No.: 14/331,952

(22) Filed: Jul. 15, 2014

(65) Prior Publication Data

US 2016/0021547 A1 Jan. 21, 2016

(51) Int. Cl.
| | |
|---|---|
| *H04W 16/26* | (2009.01) |
| *H04W 72/04* | (2009.01) |
| *H04W 28/08* | (2009.01) |
| *H04W 88/08* | (2009.01) |
| *H04W 72/12* | (2009.01) |

(52) U.S. Cl.
CPC .............. *H04W 16/26* (2013.01); *H04W 28/08* (2013.01); *H04W 72/04* (2013.01); *H04W 88/08* (2013.01); *H04W 72/1278* (2013.01)

(58) Field of Classification Search
CPC ............... H04W 16/26; H04W 72/04; H04W 72/1278; H04W 72/1263; H04W 88/08; H04W 28/08
USPC ....... 370/229, 230, 235, 310, 328, 338, 351, 370/428, 464, 465, 473, 474; 455/403, 455/422.1, 446, 448, 449
See application file for complete search history.

(56) References Cited

U.S. PATENT DOCUMENTS

| | | |
|---|---|---|
| 2008/0144545 A1 | 6/2008 | Stanwood et al. |
| 2009/0225695 A1* | 9/2009 | Kang et al. ................... 370/315 |

(Continued)

FOREIGN PATENT DOCUMENTS

| | | |
|---|---|---|
| EP | 2533582 A1 | 12/2012 |
| WO | WO 2013072108 A1 * | 5/2013 |

OTHER PUBLICATIONS

International Search Report and Written Opinion issued in International Application No. PCT/US2015/039172, mailed Sep. 22, 2015.

(Continued)

*Primary Examiner* — Obaidul Huq
(74) *Attorney, Agent, or Firm* — Harness, Dickey & Pierce, P.L.C.

(57) ABSTRACT

A transceiver station provides wireless resources including communication features for users in a geographical coverage area including a plurality of cells, each of the plurality of cells being associated with a different combination of at least one carrier and at least one sector of the geographical coverage area. The transceiver station includes a first board and a second board. The first board includes a first L1 processing circuit configured to perform functions associated with providing a first set of the communication features for the users in a first subset of cells from among the plurality of cells. The second board communicatively is coupled with the first board, and includes a second L1 processing circuit configured to perform functions associated with providing a second set of the communication features for the users in a second subset of cells from among the plurality of cells.

18 Claims, 8 Drawing Sheets

(56) References Cited

U.S. PATENT DOCUMENTS

| | | |
|---|---|---|
| 2010/0113009 A1 | 5/2010 | Jeong et al. |
| 2011/0098054 A1* | 4/2011 | Gorokhov et al. ........ 455/452.1 |
| 2013/0077482 A1 | 3/2013 | Krishna et al. |
| 2013/0225189 A1 | 8/2013 | Moon et al. |
| 2014/0355567 A1* | 12/2014 | Irmer et al. ................... 370/331 |

OTHER PUBLICATIONS

U.S. Office Action issued in U.S. Appl. No. 14/331,883, dated Feb. 9, 2016.

International Search Report and Written Opinion issued in International Application No. PCT/US2015/039171, mailed Sep. 22, 2015.

* cited by examiner

MULTI-BOARD ARCHITECTURE FOR WIRELESS TRANSCEIVER STATION

BACKGROUND

Wireless technology standards, such as 3$^{rd}$ Generation, 4$^{th}$ Generation and 5$^{th}$ Generation standards, adopt new technologies, add new features, and increase data rates much faster than actual hardware developments and deployments. As a result, the capacity of a NodeB (or base station) platform (e.g., a hardware board such as a modem board) fills up quickly. This reduces the life cycle of a platform, which then requires more frequent development of new platforms. However, developing new platforms not only increases costs, but may delay product delivery time.

5$^{TH}$ Generation wireless systems are the next evolution in the wireless communication industry. Such systems may integrate 2$^{nd}$, 3$^{rd}$, 4$^{th}$, 5$^{th}$ Generation components, as well as WiFi, to form a global networking system. 5$^{th}$ Generation systems may have data rates more than 10-100 faster than today's data rates, and may connect a broader range of devices to serve the internet of things. 5$^{th}$ Generation systems also implement new technologies and add new features relative to conventional 2$^{nd}$, 3$^{rd}$ and 4$^{th}$ Generation technologies.

Conventionally, L1/L2 processing boards (also sometimes referred to as modem boards) at a NodeB utilize a single-board architecture (SBA). In this conventional architecture, each board is connected to all radio-frequency (RF) antennas, and performs both L2 scheduling and L1 processing for all cells in the NodeBs coverage area. As a result, all standard features are implemented on each board. This "one board for all" solution shortens the life cycle of the boards and limits the ability for additional features (e.g., new 5$^{th}$ Generation features) to be added to existing boards.

SUMMARY

At least some example embodiments provide a multi-board architecture (MBA) for L1 processing boards at a base station.

At least some example embodiments provide methods for load balancing of communication features among L1 processing boards at a NodeB.

According to at least some example embodiments, multiple L1 processing boards at a NodeB are viewed together as a system, thereby enabling dynamic distribution of radio-frequency (RF) antenna streams, communication features and/or communication feature sets among multiple L1 processing boards at the NodeB. As discussed herein, a NodeB may also be referred to as a transceiver station.

According to at least some example embodiments, multiple L1 processing boards at a NodeB are viewed together as a system, thereby enabling dynamic load balancing for communication features among processing boards at a NodeB.

According to at least some example embodiments, different L1 boards are connected to different RF antenna sets, and a different communication features may be distributed among multiple L1 boards, such that each L1 processing board provides functions associated with different communication features in the wireless system. Different boards may have different software and/or hardware components for processing different communication features or sets of communication features.

Wireless systems include of one or more sets of communication features. Each communication feature is designed for a specific goal in a specific scenario. Examples of communication features are: a single-carrier uplink/downlink feature in which a user uses only a single frequency band (or carrier); a multi-carrier uplink/downlink feature in which a user combines multiple frequency bands (or carriers) together to reach higher communication data rates; interference cancelation; call handover for a user moving from one geographic sector to another geographic sector; voice over 3rd Generation Partnership Project Long Term Evolution (3GPP-LTE); user power saving modes to stop some transmissions if data need not be transmitted; multiple-input-multiple-output (MIMO); single-input-single-output (SISO), etc.

The multi-board architecture according to one or more example embodiments may reduce unnecessary resource consumption at a NodeB by decreasing duplicated functionality present in the conventional single board architecture. In one example, the L1 processing boards process only a portion or fraction of the antenna streams as compared to the conventional single board architecture.

At least one example embodiment provides a transceiver station providing wireless resources including communication features for users in a geographical coverage area, the geographical coverage area including a plurality of cells, and each of the plurality of cells being associated with a different combination of at least one carrier and at least one sector of the geographical coverage area, the transceiver station including: a first board including a first L1 processing circuit configured to perform functions associated with providing a first set of the communication features for the users in a first subset of cells from among the plurality of cells; and a second board communicatively coupled with the first board, the second board including a second L1 processing circuit configured to perform functions associated with providing a second set of the communication features for the users in a second subset of cells from among the plurality of cells, the first set of the communication features being different from the second set of the communication features.

The first L1 processing circuit may be further configured to perform functions associated with providing only the first set of the communication features. The second L1 processing circuit may be further configured to perform functions associated with providing only the second set of the communication features.

The first set and/or second set of the communication features may include less than all of the communication features provided by the transceiver station.

Each communication feature in the first set of the communication features may be different from each communication feature in the second set of the communication features.

Only a portion of the communication features in the first and second sets of the communication features may be the same.

The first L1 processing circuit may be further configured to obtain control information based on a radio-frequency signal stream received on at least a first carrier in the first subset of cells, and to output the obtained control information to the second L1 processing circuit; and the second L1 processing circuit is further configured to perform the functions associated with providing the second set of the communication features for the users in the second subset of cells based on the control information from the first L1 processing circuit.

The first L1 processing circuit may be further configured to output the obtained control information to the second L1 processing circuit via an L1 interface message.

The functions associated with providing the first set of the communication features for the users in the first subset of cells from among the plurality of cells may include: processing a received uplink control channel to obtain uplink control channel information for uplink transmissions by a first of the users in the first subset of cells; processing, based on the obtained uplink control channel information, a received first uplink data channel to recover first data bit sequences transmitted by the first user in the first subset of cells; and outputting the obtained uplink control channel information and recovered first data bit sequences to a central office for further processing.

The first L1 processing circuit may be further configured to output the obtained uplink control channel information to the second L1 processing circuit. The functions associated with providing the second set of the communication features for the users in the second subset of cells from among the plurality of cells may include: processing, based on the uplink control channel information from the first L1 processing circuit, a received second uplink data channel to recover second data bit sequences transmitted by the first user in the second subset of cells; and outputting the recovered second data bit sequences to a central office for further processing.

The functions associated with providing the first set of the communication features for the users in the first subset of cells from among the plurality of cells may include: encoding a received downlink data set to generate a radio-frequency signal stream for transmission to a first of the users on at least a first carrier in the first subset of cells; and outputting the generated radio-frequency signal stream for transmission to the first user.

The first board may be configured to: identify a capacity overload for at least one communication feature in the first set of communication features for the users; and transfer, from the first board to the second board, functions associated with providing the at least one communication feature to at least one user if the first board identifies the capacity overload for the at least one communication feature at the first board.

The second board may be configured to perform the transferred functions to provide the at least one communication feature to the at least one user.

At least one other example embodiment provides a method for providing wireless resources including communication features for users in a geographical coverage area, the geographical coverage area including a plurality of cells, and each of the plurality of cells being associated with a different combination of at least one carrier and at least one sector of the geographical coverage area, the method including: first performing functions associated with providing a first set of the communication features for the users in a first subset of cells from among the plurality of cells; and second performing functions associated with providing a second set of the communication features for the users in a second subset of cells from among the plurality of cells, the first set of the communication features being different from the second set of the communication features.

The first performing step may perform functions associated with providing only the first set of the communication features for the users. The second performing step may perform functions associated with providing only the second set of the communication features for the users.

The first set and/or second set of the communication features may include less than all of the communication features for the users; and Only a portion of the communication features in the first and second sets of the communication features may be the same.

The first performing step may include: obtaining, at a first L1 processing circuit, control information based on a radio-frequency signal stream received on at least a first carrier in the first subset of cells; and outputting the obtained control information from the first L1 processing circuit to a second L1 processing circuit. The second performing step may perform, at the second L1 processing circuit, the functions associated with providing the second set of the communication features for the users in the second subset of cells based on the control information from the first L1 processing circuit.

The first performing step may include: processing a received uplink control channel to obtain uplink control channel information for uplink transmissions by a first of the users in the first subset of cells; processing, based on the obtained uplink control channel information, a received first uplink data channel to recover first data bit sequences transmitted by the first user in the first subset of cells; and outputting the obtained uplink control channel information and recovered first data bit sequences to a central office for further processing.

The method may further include: outputting the obtained uplink control channel information from a first L1 processing circuit to a second L1 processing circuit. The second performing step may include: processing, based on the uplink control channel information from the first L1 processing circuit, a received second uplink data channel to recover second data bit sequences transmitted by the first user in the second subset of cells; and outputting the recovered second data bit sequences to a central office for further processing.

The first performing step may include: encoding a received downlink data set to generate a radio-frequency signal stream for transmission to a first of the users on at least a first carrier in the first subset of cells; and outputting the generated radio-frequency signal stream for transmission to the first user.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
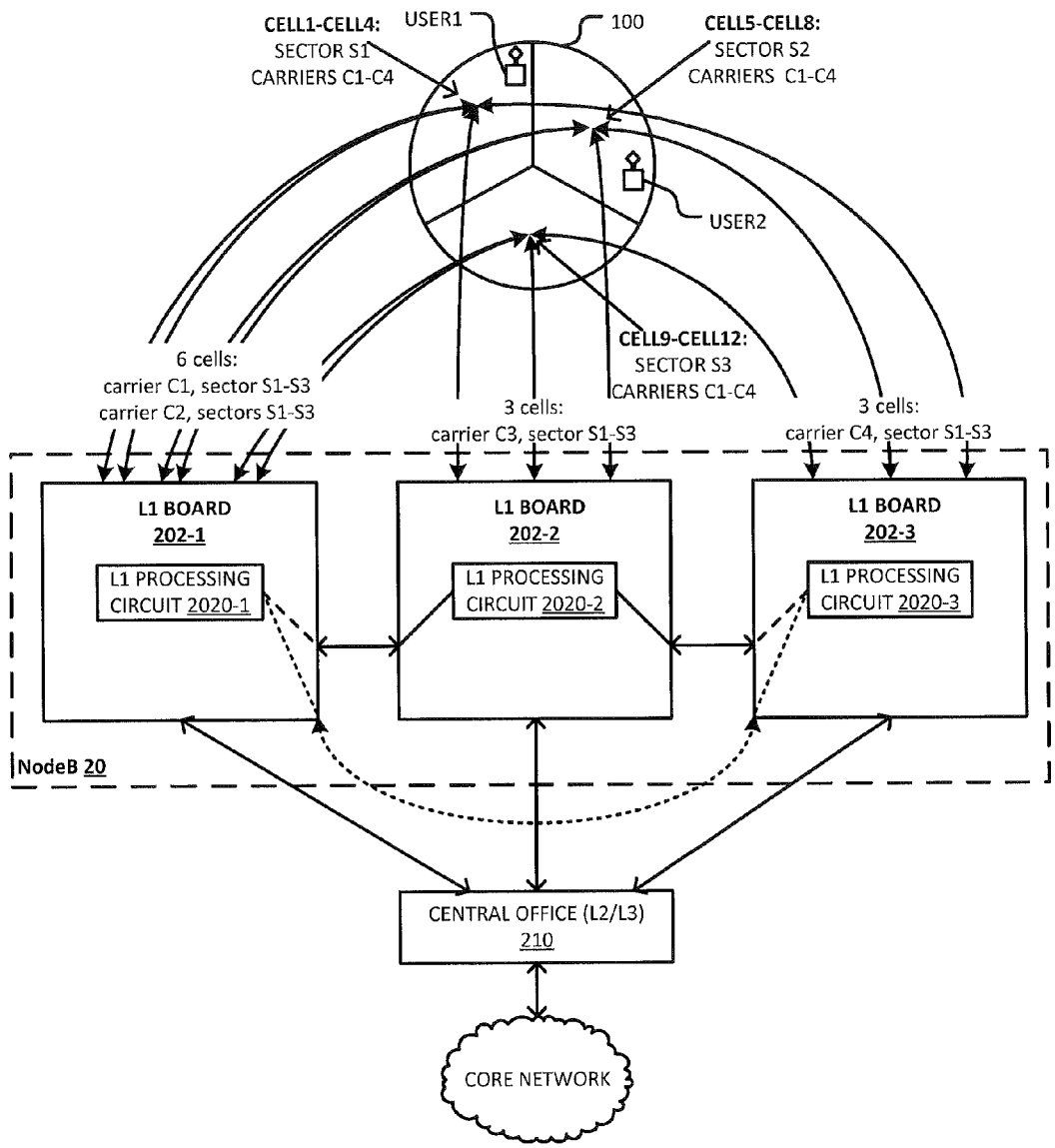
FIG. 1 illustrates a portion of a wireless communications network including a NodeB having a multi-board architecture (MBA) according to an example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing base stations, NodeBs, eNodeBs, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "NodeB" may be considered synonymous to, and may hereafter be occasionally referred to as a Node B, base station, transceiver station, base transceiver station (BTS), etc., and describes a transceiver in communication with and providing wireless resources to users in a geographical coverage area. As discussed herein, NodeBs may have all functionally associated with conventional, well-known base stations in addition to the capability and functionality to perform the methods discussed herein.

For the sake of simplicity, the term NodeB may be used to represent a NodeB for $3^{rd}$ Generation Wideband Code Division Multiple Access (WCDMA), an eNodeB for $4^{th}$ Generation Long Term Evolution (LTE), a general base station for other wireless systems such as Code Division Multiple Access (CDMA), Worldwide Interoperability for Microwave Access (WiMax), $5^{th}$ Generation systems, and a NodeB or base station for combinations of these wireless protocols.

The term "user" as discussed herein, may be considered synonymous to, and may hereafter be occasionally referred to, as a user equipment ("UE"), client, mobile unit, mobile station, mobile user, mobile, subscriber, user, remote station, access terminal, receiver, etc., and describes a remote user of wireless resources in a wireless communication network.

As discussed herein, uplink (or reverse link) transmissions refer to transmissions from user to NodeB (or network), whereas downlink (or forward link) transmissions refer to transmissions from NodeB (or network) to user.

As discussed herein, a carrier refers to a frequency bandwidth for a user. In a Wideband Code Division Multiple Access (WCDMA) network, a carrier is 5 MHz frequency bandwidth. In a Third Generation Partnership Project Long Term Evolution (3GPP LTE) network, a carrier may be 1.4 MHz, 3 MHz, 5 MHz, 10 MHz, 15 MHz or 20 MHz.

As described herein, L1 refers to Layer 1, L2 refers to layer 2, L3 refers to layer 3, and a "board" (or "processing board") refers to a L1 baseband processing board.

Some example embodiments will be discussed herein with regard to a geographical coverage area divided into 3 sectors with 4 carriers per sector resulting in a total of 12 cells. Other example embodiments will be discussed herein with regard to a geographical coverage area divided into 3 sectors with a single carrier and a total of 3 cells. However, it should be understood that example embodiments also apply to any number of carriers, any number of sectors per carrier, any number of cells, and any number of antennas per carrier.

Although example embodiments are discussed herein with regard to $5^{TH}$ Generation systems, example embodiments may also be applied to other wireless technologies and systems such as CDMA, WiMAX, LTE, etc.

Example embodiments provide a multi-board architecture for a NodeB in which communication features, sets of communication features and/or tasks associated with one or more communication features for one or more users may be distributed among different L1 processing boards at a NodeB. In at least some example embodiments, each L1 processing board may process different communication features, different sets of communication features and/or different tasks associated with communication features. As discussed herein, communication features may also be referred to as user features or user communication features.

As discussed above, examples of communication features are: a single-carrier uplink/downlink feature in which a user uses only a single frequency band (or carrier); a multi-carrier uplink/downlink feature in which a user combines multiple frequency bands (or carriers) together to reach higher communication data rates; interference cancelation; call handover for a user moving from one geographic sector to another geographic sector; voice over 3rd Generation Partnership Project Long Term Evolution (3GPP-LTE); user power saving modes to stop some transmissions if data need not be transmitted; multiple-input-multiple-output (MIMO); single-input-single-output (SISO); etc. Example sets of communication features may include one or more of the communication features discussed herein.

Each communication feature may include multiple different functions or tasks, and different communication features or sets of communication features may be distributed among, and performed by, different L1 processing boards at one or more NodeBs (e.g., the same or different NodeBs). For example, functions associated with providing the multi-carrier uplink/downlink communication feature may be performed at a first L1 processing board; functions associated with providing the single-carrier uplink/downlink communication feature may be performed at a second L1 processing board; etc.

In another example, the single-carrier uplink/downlink communication feature may be divided into a task for each of multiple sectors in the NodeB's geographical coverage area. In this regard, the single-carrier uplink/downlink communication feature for different sectors may be distributed among the plurality of L1 processing boards on a per-sector basis; that is, on a sector-by-sector basis. In this example, the L1 processing for uplink and downlink transmissions on different sectors may be distributed among different L1 processing boards at the NodeB.

In yet another example, the multi-carrier uplink/downlink feature for a first subset of cells (e.g., a first communication feature or first set of communication features) may be performed at a first L1 processing board, whereas the multi-carrier uplink/downlink feature and interference cancelation for a second subset of cells (e.g., a second set of communication features) may be performed at a second L1 processing board. In this case, the number of cells in the first subset of cells may be greater than the number of cells in the second subset, thereby distributing and balancing the load of the communication features at the NodeB.

Some example embodiments will be described with regard to a multi-carrier uplink/downlink communication feature and an interference cancelation feature in which processing associated with these features in different cells is distributed among different L1 processing boards at a NodeB. However, it should be understood that example embodiments may be applied to different communication features in the same or substantially the same manner.

FIG. 1 illustrates a portion of a $5^{th}$ Generation (5G) wireless network including a NodeB having a multi-board architecture (MBA) according to an example embodiment. The 5G network shown in FIG. 1 is a network central system.

Referring to FIG. 1, the NodeB 20 serves multi-carrier users (represented by multi-carrier users USER1 and USER2) in a geographical coverage area 100 by providing wireless resources including communication features for the users. The NodeB 20 is communicatively coupled to a central office 210. The central office 210 is further coupled to a core network.

The central office 210 processes information to/from radio-frequency (RF) antennas across multiple NodeBs. The central office 210 includes, inter alia, one or more L2 schedulers to carry out L2 scheduling operations, and one or more L3 processing boards to carry out L3 operations. In more detail, the one or more L2 schedulers perform scheduling functions for each of the L1 processing boards for all cells. For a specific multi-carrier user (e.g., user USER1 and/or user USER2) shown in FIG. 1, a L2 scheduler performs scheduling functions for 4 carriers in the sector in which the user is located. L3 processing includes: radio resource control (RRC) such as connection management; broadcast of system information; security mode control; measurement procedure; higher layer access; etc.

Together, the L2 scheduler(s) and the L3 processing board/block/circuit at the central office 210 perform, for example, cell configuration, resource allocation, and channel adding/removing for each user.

The L2 scheduler(s) at the central office 210 is (are) communicatively coupled to the NodeB 20 and each of the L1 processing boards through a common public radio interface (CPRI) link.

Still referring to FIG. 1, the NodeB 20 includes a plurality of L1 processing boards 202-1, 202-2 and 202-3. The L1 processing boards 202-1, 202-2 and 202-3 are operatively (or communicatively) coupled to one another so as to exchange information with one another. The L1 processing boards 202-1, 202-2 and 202-3 are separate from, but interconnected with, one another at the NodeB 20. In this regard, the L1 processing boards 202-1, 202-2 and 202-3 are arranged to have a multi-board architecture (MBA), rather than a single-board architecture (SBA).

In one example, the L1 processing boards 202-1, 202-2 and 202-3 exchange information with one another via L1 interface messages. As discussed in more detail below, L1 interface messages may include: uplink and/or downlink control channel information, user data sets, etc.

Example embodiments are discussed herein with regard to major L1 functions (e.g., modulation and demodulation) being performed at the L1 processing boards at the NodeB, and major L2 functions (e.g., scheduling) being performed at the central office. However, some L1/L2 interface parts may be implemented at the L1 processing boards or at the central office. Therefore, a L1 processing board may have minor L2 functionality, and a L2 scheduler at the central office may have minor L1 functionality. For example, combining of uplink data from multiple antennas may be considered minor L2 functionality, but may be implemented at a L1 processing board if the antenna set is located on the L1 processing board. In another example, cyclic redundancy check (CRC) and payload separation may be considered minor L1 functionality, but may be implemented at the L2 scheduler.

Figure 2:
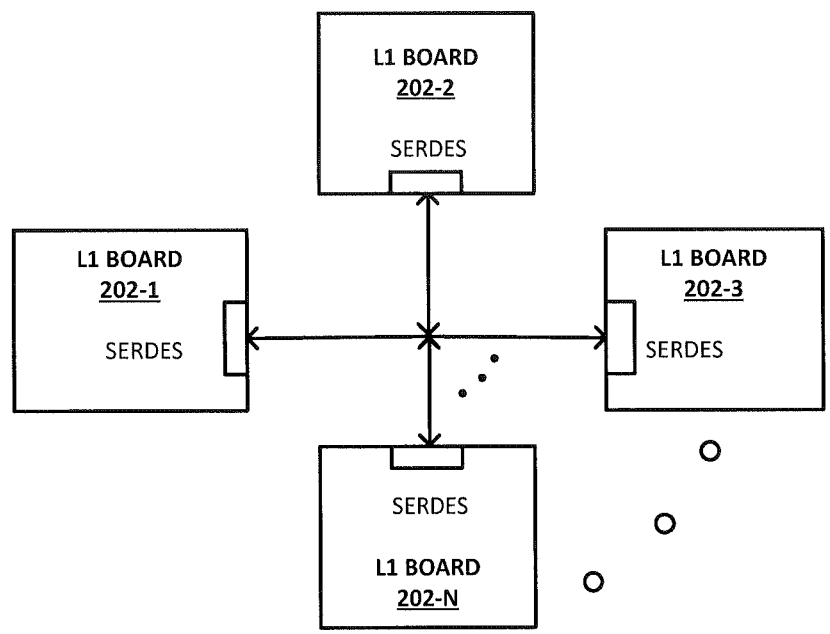
FIGS. 2 and 3 illustrate example interconnection configurations of L1 processing boards at a NodeB.
Figure 3:
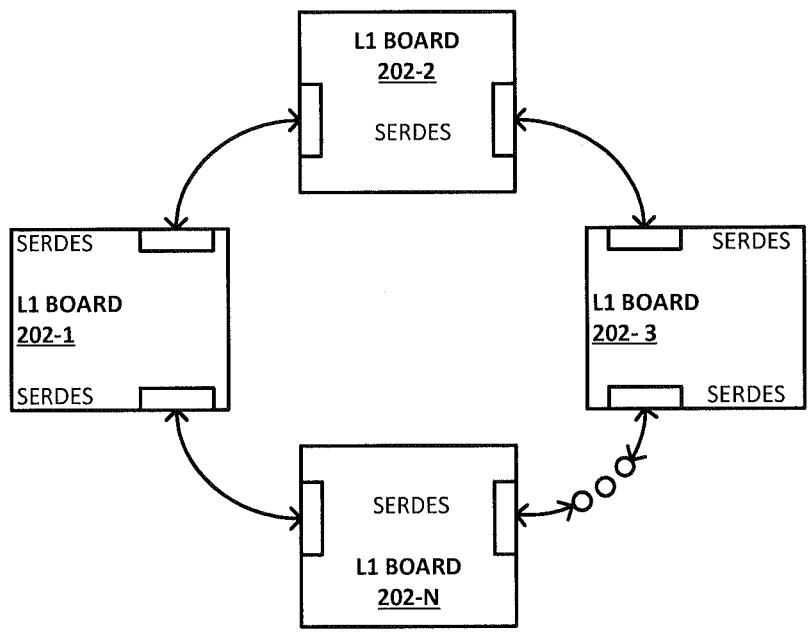

The L1 processing boards 202-1, 202-2 and 202-3 shown in FIG. 1 may be coupled to one another in various ways. FIGS. 2 and 3 illustrate example configurations for inter-board links between N L1 processing boards at a NodeB, such as NodeB 20. In the example embodiment shown in FIG. 1, N=3. However, example embodiments are not limited to this example.

In more detail, FIG. 2 illustrates a star topology for connecting N L1 processing boards 202-1, 202-2, 202-3, . . . , 202-N. In the example shown in FIG. 2, each L1 processing board has a single serializer/deserializer (SER-DES) I/O port for exchanging information with other L1 processing boards.

FIG. 3 illustrates a ring topology for interconnecting the N L1 processing boards 202-1, 202-2, 202-3, . . . , 202-N. In this example, each L1 processing board has 2 SERDES I/O ports exchanging information with other L1 processing boards.

In the example configurations shown in FIGS. 2 and 3, each of the interconnection configurations utilizes a high speed SERDES physical link, such as a serial RapidIO (sRIO) industry standard link. However, example embodiments should not be limited to these examples.

Although only ring and star topologies are discussed herein, the L1 processing boards may be interconnected using any suitable interconnection topology.

Returning to FIG. 1, each of the L1 processing boards includes an L1 processing circuit. In more detail, the L1 processing board 202-1 includes a L1 processing circuit 2020-1; the L1 processing board 202-2 includes a L1 processing circuit 2020-2; and the L1 processing board 202-3 includes a L1 processing circuit 2020-3.

According to example embodiments, the L1 processing circuits may be hardware, firmware, hardware executing software or any combination thereof. When the L1 processing circuits are hardware, such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions (e.g., implementation of communication features, sets of communication features and/or tasks/functions associated with communication features or sets of communication features) of the L1 processing circuits. CPUs, SOCs, DSPs, ASICs and FPGAs may generally be referred to as processors and/or microprocessors.

As discussed herein, the L1 processing circuits may be described as local or remote relative to a given L1 processing board. For example, the L1 processing circuit 2020-1 may be referred to as a local L1 processing circuit relative to the L1 processing board 202-1, but as a remote L1 processing circuit relative to the L1 processing boards 202-2 and 202-3. As mentioned above, the L1 processing boards 202-1, 202-2, and 202-3 are interconnected with one another. In this regard, each L1 processing board and circuit is operatively connected or communicatively coupled to each of the other L1 processing boards and circuits.

Example operation of the L1 processing boards 202-1, 202-2 and 202-3 as well as the components thereof will be discussed in more detail below with regard to FIGS. 4-9.

As mentioned above, for simplification and clarity of description, example embodiments shown in FIGS. 4-8 will be described with regard to the NodeB 20 being configured for 4 carriers (C1, C2, C3, C4) within the geographical coverage area 100 that is divided into 3 sectors (S1, S2, S3), 2 antennas per carrier, and total of 12 radio-frequency (RF) cells (CELL1-CELL12)

The 12 RF cells (CELL1-CELL12) are divided into 3 groups based on sector and carrier. RF cells CELL1-CELL4 are in sector S1, RF cells CELL5-CELL8 are in sector S2, and RF cells CELL9-CELL12 are in sector S3.

RF cell CELL1 corresponds to carrier C1 in sector S1; RF cell CELL2 corresponds to carrier C2 in sector S1; RF cell CELL3 corresponds to carrier C3 in sector S1; RF cell CELL4 corresponds to carrier C4 in sector S1; RF cell CELL5 corresponds to carrier C1 in sector S2; RF cell CELL6 corresponds to carrier C2 in sector S2; RF cell CELL7 corresponds to carrier C3 in sector S2; RF cell CELL8 corresponds to carrier C4 in sector S2; RF cell CELL9 corresponds to carrier C1 in sector S3; RF cell CELL10 corresponds to carrier C2 in sector S3; RF cell CELL11 corresponds to carrier C3 in sector S3; and RF cell CELL12 corresponds to carrier C4 in sector S1.

Further, although example embodiments are described with regard to 3 sectors (S1, S2, S3), each of sectors S1, S2, and S3 may represent a subset of sectors, where each subset includes one or more sectors. In this example, each subset of sectors may be different, and more particularly, each sector in one subset of sectors may be different from the sectors in a second subset of sectors. Similarly, although example embodiments are described with regard to 4 carriers (C1, C2, C3, C4), each of carriers C1 through C4 may represent a subset of carriers, where each subset includes one or more carriers. In this example, each subset of carriers may be different, and more particularly, each carrier in a subset of carriers may be different from the carriers in a second subset of carriers.

As mentioned above, the example NodeB 20 shown in FIG. 1 has 2 RF antennas per cell. In the example discussed above, the two RF antennas for each of carriers C1 and C2 (i.e., a total of four RF antennas) are connected to L1 processing board 202-1; the two RF antennas for carrier C3 are connected to L1 processing board 202-2; and the two RF antennas for carrier C4 are connected to L1 processing board 202-3. As a result, the 12 cells CELL1-CELL12 provided by the NodeB 20 are distributed among the 3 L1 processing boards 202-1, 202-2, and 202-3. More specifically, 6 cells CELL1, CELL2, CELL5, CELL6, CELL9 and CELL10 (which can also be described as carriers C1 and C2 at sectors S1 through S3) are connected to L1 processing board 202-1; 3 cells CELL3, CELL7 and CELL11 (which can also be described as carrier C3 at sectors S1 through S3) are connected to L1 processing board 202-2; and 3 cells CELL4, CELL8 and CELL12 (which can also be described as carrier C4 at sectors S1 through S3) are connected to L1 processing board 202-3.

It should be understood that example embodiments are not limited to the particular distribution of cells among processing boards discussed herein.

According to at least some example embodiments, each of at least two L1 processing boards may be associated with a different set of communication features for users. A set of communication features may include one or more communication features. In some example embodiments, communication features in each set of communication features may overlap, whereas in other example embodiments the communication features in each set of communication features may not overlap, such that each communication feature in a first set of communication features is different from each communication feature in a second set of communication features.

According to some example embodiments, each of at least two L1 processing boards at a NodeB performs functions associated with a different set of one or more user communication features. For example, L1 processing board 202-1 may perform functions associated with a first set of communication features (e.g., a multi-carrier uplink/downlink communication feature); whereas L1 processing boards 202-2 and 202-3 may perform functions associated with a second set of communication features (e.g., a multi-carrier uplink/downlink communication feature as well as an interference cancelation feature; this can also be referred to as a multi-carrier uplink/downlink with interference cancelation communication feature).

In this example, with regard to the multi-carrier uplink/downlink communication feature, L1 processing board 202-1 performs functions for providing this communication feature for carriers C1 and C2 in sectors S1 through S3 (i.e., in cells CELL1, CELL2, CELL5, CELL6, CELL9 and CELL10); L1 processing board 202-2 performs functions for providing this communication feature for carrier C3 in sectors S1 through S3 (i.e., in cells CELL3, CELL7 and CELL11); and L1 processing board 202-3 performs functions for providing this communication feature for carrier C4 in sectors S1 through S3 (i.e., in cells CELL4, CELL8 and CELL12).

Additionally, L1 processing boards 202-2 and 202-3 perform functions for providing the interference cancelation feature for carrier C3 in sectors S1 through S3 (i.e., in cells CELL3, CELL7 and CELL11) and carrier C4 in sectors S1 through S3 (i.e., in cells CELL4, CELL8 and CELL12), whereas L1 processing 202-1 does not perform functions for providing this feature to users in cells CELL1, CELL2, CELL5, CELL6, CELL9 and CELL10.

For example purposes, some example embodiments may be described with regard distribution of the multi-carrier uplink/downlink feature and the interference cancelation feature for users. When described with regard to user USER1, carrier C1 will be described as an anchor carrier, the L1 processing board 202-1 will be described as an anchor L1 processing board and the L1 processing circuit 2020-1 will be described as an anchor L1 processing circuit, whereas carriers C2, C3 and C4 will be described as an secondary carriers, the L1 processing boards 202-2 and 202-3 will be described as a secondary L1 processing boards and the L1 processing circuits 2020-2 and 2020-3 will be described as an secondary L1 processing circuits. Similarly, cell CELL1 may be described as an anchor cell, whereas cells CELL2, CELL3 and CELL4 may be described as secondary cells. However, it should be understood that any of cells CELL1 through CELL12 may serve as both an anchor cell for some users and a secondary cell for other users, carriers C1 through C4 may be both an anchor carrier for some users and a secondary carrier for other users, and each of the L1 processing boards may serve as both anchor L1 processing board with regard to some users and a secondary L1 processing board with regard to other users. Similarly, each of the L1 processing circuits may serve as both anchor L1 processing circuit and a secondary L1 processing circuit. In at least some example embodiments, the L1 processing board 202-1 may function as an anchor L1 processing board with regard to carrier C1 and a secondary L1 processing board with regard to carrier C2.

Moreover, for example purposes, some example embodiments will be described with regard to uplink transmissions for multi-carrier users USER1 in FIG. 1. However, it should be understood that similar processing may be performed for any number of users in a wireless communications network.

Figure 5:
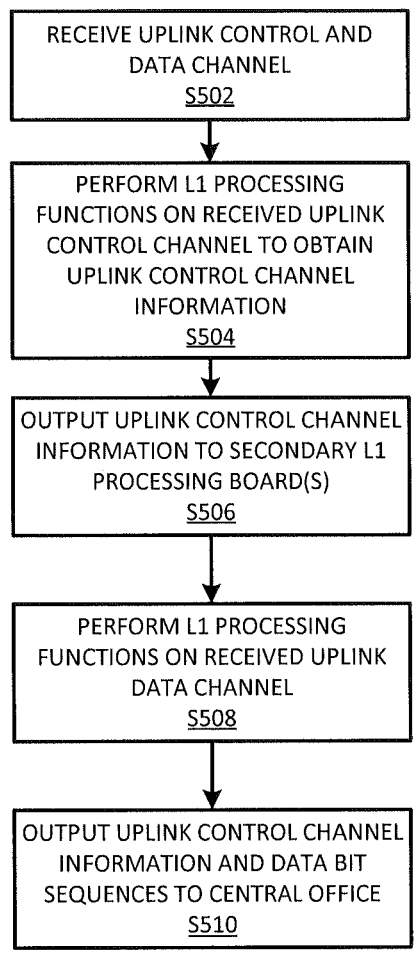
FIG. 5 is a flow chart illustrating a method of processing uplink communications at an anchor L1 processing board in a MBA, according to an example embodiment.
Figure 6:
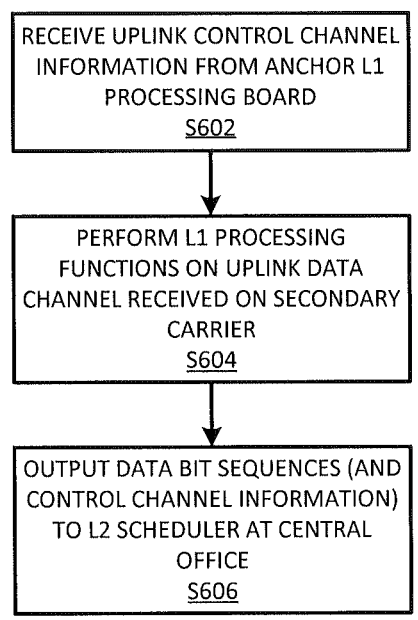
FIG. 6 is a flow chart illustrating a method of processing uplink communications at a secondary L1 processing board in an MBA, according to an example embodiment.

FIG. 5 is a flow chart illustrating an example embodiment of a method of processing uplink communications at the anchor L1 processing board 202-1. FIG. 6 is a flow chart illustrating an example embodiment of a method of processing uplink communications at a secondary L1 processing board (e.g., 202-2 and/or 202-3).

Together, the example embodiments shown in FIGS. 5 and 6 illustrate an example of functionality associated with the multi-carrier uplink tasks for the multi-carrier uplink communication feature for a multi-carrier user. That is, for example, the methods shown in FIGS. 5 and 6 illustrate functions associated with providing the multi-carrier uplink communication feature for a multi-carrier user in a MBA, according to an example embodiment.

For example purposes, the methods shown in FIGS. 5 and 6 will be described with regard to multi-carrier user USER1 and the portion of the communications network shown in FIG. 1.

Referring to FIGS. 1 and 5, at step S502 the anchor L1 processing circuit 2020-1 receives, via one or more RF antenna streams, an uplink physical channel transmitted by the user USER1 on anchor carrier C1 in sector S1 (cell CELL1). In this example, the uplink physical channel includes an uplink control channel and an uplink data channel.

At step S504, the anchor L1 processing circuit 2020-1 performs L1 processing functions on the received uplink control channel to obtain uplink control channel information. In more detail, at step S504 the anchor L1 processing circuit 2020-1 demodulates and decodes the uplink control channel to obtain the uplink control channel information. In one example, the uplink control channel information may include: timing/synchronization information; channel quality indication information (e.g., CQI information); reception quality information (e.g., Ack/Nack for indicating if the user USER1 successfully received the last transmission by the NodeB 20); power control loop information; etc.

For the multi-carrier uplink communication feature for the user USER1, only the anchor cell CELL1 has an uplink control channel, and all secondary cells CELL2 through CELL4 share the anchor cell uplink control channel. Consequently, in this example only the anchor L1 processing circuit 2020-1 receives the uplink control channel portion of the uplink physical channel in conjunction with anchor cell CELL1.

Still referring to FIG. 5, at step S506 the anchor L1 processing circuit 2020-1 outputs the uplink control channel information to the secondary L1 processing circuits 2020-2 and 2020-3. In more detail, at step S506 the anchor L1 processing circuit 2020-1 generates control channel information packets including the uplink control channel information, and the L1 processing board 202-1 outputs the control channel information packets to the secondary L1 processing boards 202-2 and 202-3.

In one example, the uplink control channel information includes timing information as well as power control loop information for the anchor cell CELL1 and the secondary cells CELL2 through CELL4. Since the power control loop is a L1 function implemented on the L1 processing circuits, the anchor L1 processing board 202-1 provides the power control loop information to the secondary L1 processing boards 202-2 and 202-3. The L1 processing board 202-1 also provides the timing information to the secondary processing boards 202-2 and 202-3 for synchronizing processing among the L1 processing boards. The anchor L1 processing board 202-1 provides the uplink control channel information to the secondary L1 processing boards 202-2 and 202-3 through the inter-board communication links discussed above using L1 interface messages.

Still referring to FIGS. 1 and 5, at step S508 the anchor L1 processing circuit 2020-1 performs L1 processing functions on the received uplink data channel. In more detail, at step S508, using the uplink control channel information the anchor L1 processing circuit 2020-1 demodulates the uplink data channel received via one or more RF antenna streams to recover data symbols transmitted by the user USER1 on carrier C1 in sector S1 (cell CELL1). The L1 processing circuit 2020-1 combines diversity antenna symbols and decodes the combined data symbols to recover L1 data bit sequences (also referred to as the transport block, payload data, or data packets) transmitted by the user USER1.

At step S510, the anchor L1 processing circuit 2020-1 outputs the uplink control channel information and recovered data bit sequences (transport block or payload data) to an L2 scheduler (not shown) at the central office 210 via the CPRI link discussed above. The functionality of the L2 scheduler at the central office 210 will be described in more detail later.

Referring now to FIG. 6, at step S602 the secondary L1 processing circuit 2020-2 receives the control channel information packets including uplink control channel information from the anchor L1 processing board 202-1. As mentioned above, the uplink control channel information includes, for example, uplink power control loop information and timing information. The secondary L1 processing circuit 2020-2 uses the timing information to synchronize the processing of the uplink transmissions received on carrier C3 with the processing of uplink transmissions received on carriers C1, C2 and C4. In this regard, the secondary L1 processing circuit 2020-2 may use the timing information to synchronize the processing of uplink transmissions received on carrier C3 in sector S1 (cell CELL3) with the processing of uplink transmissions received on anchor carrier C1 in sector S1 (cell CELL1). By synchronizing processing of uplink transmissions received on secondary carriers with the processing of uplink transmissions on the anchor carrier, the processing of uplink transmissions on all carriers may be synchronized.

The uplink power control loop information provided by the anchor L1 processing circuit is utilized as follows.

For downlink transmissions on multiple carriers in multiple cells, a user measures the downlink channel quality information (CQI), and performs cyclic redundancy check (CRC, Ack/Nack) for the received data in different cells. The user combines the CQI and the Ack/Nack information for the anchor cell and secondary cells, and sends the combined information to the NodeB via the uplink control channel in the anchor cell. The anchor L1 processing circuit decodes the CQI and Ack/Nack information and splits the information into an anchor cell set and secondary cell sets. The anchor L1 processing circuit adjusts (e.g., increases or decreases) the downlink transmit power based on the user reported channel quality information (CQI) for the anchor cell. The anchor L1 processing circuit then sends the secondary CQI to the secondary L1 processing board for the secondary L1 processing circuit to adjust (e.g., increase or decrease) the downlink transmit power in the secondary cell based on the user reported secondary cell CQI information.

Still referring to FIG. 6, at step S604 the secondary L1 processing circuit 2020-2 performs L1 processing functions on the uplink data channel transmitted by the user USER1 on the secondary carrier C3 in sector S1 (secondary cell CELL3). In more detail, at step S604 using the uplink control channel information from the anchor L1 processing board 202-1, the secondary L1 processing circuit 2020-2 demodulates the uplink data channel transmitted on the secondary carrier C3 in sector S1 (secondary cell CELL3) to recover data symbols transmitted by the user USER1. The secondary L1 processing circuit 2020-2 combines diversity antenna symbols, and decodes the combined symbols to recover L1 data bit sequences (transport block or payload data) transmitted by the user USER1 on the secondary carrier C3.

At step S606, the secondary L1 processing circuit 2020-2 outputs the recovered transmitted data bit sequences to the L2 scheduler at the central office 210. The secondary L1 processing circuit 2020-2 may also output control channel information packets. The control channel information packets for the secondary cell CELL3 may include control channel information, such as encoding information indicating how the transport block (recovered data bits) is (are) defined and encoded.

As is known, there are multiple control channels for a given cell. And, different control channels provide different sets of control information. In one example, the secondary L1 processing board decodes uplink data channel and the corresponding uplink control channel that provides data channel encoding information. According to at least some example embodiments, each L1 processing board sends decoded data packets (transport block) and a corresponding control message (indicating how the transport block is defined and encoded) to the L2 scheduler at the central office for further processing.

The L2 scheduler at the central office 210 receives uplink control channel information packets and transmitted data bit sequences from the L1 processing boards 202-1, 202-2 and 202-3. In more detail, the L2 scheduler receives uplink control channel information packets and recovered data bit sequences transmitted by the user USER1 on anchor carrier C1 in sector S1 (cell CELL1) and secondary carrier C2 in sector S1 (cell CELL2) from anchor L1 processing board 202-1; receives uplink control channel information packets and recovered data bit sequences transmitted by the user USER1 on secondary carrier C3 in sector S1 (cell CELL3) from secondary L1 processing board 202-2; and receives uplink control channel information packets and recovered data bit sequences transmitted by the user USER1 on secondary carrier C4 in sector S1 (cell CELL4) from the secondary L1 processing board 202-3. Using the uplink control channel information, the L2 scheduler combines the recovered data bit sequences from the L1 processing boards 202-1, 202-2 and 202-3 for higher layer (e.g., L3) information processing at the central office 210, and then further transmission via the core network.

The downlink portion of the multi-carrier uplink/downlink communication feature implemented at a NodeB having a MBA according to an example embodiment will now be described in detail.

On the downlink, the L2 scheduler splits or divides downlink user data into a plurality of data sets. Each of the plurality of data sets includes data to be transmitted to the user USER1 on one of carrier C1 in sector S1 (cell CELL1), carrier C2 in in sector S1 (cell CELL2), carrier C3 in sector S1 (cell CELL3) and carrier C4 in sector S1 (cell CELL4). The L2 scheduler then outputs the data sets to the L1 processing boards 202-1, 202-2 and 202-3 on a per-carrier basis. In one example, the L2 scheduler may distribute the data sets among the L1 processing boards 202-1, 202-2 and 202-3 on a per-carrier basis such that the functions for providing the multicarrier downlink communication feature to the user USER1 are distributed among the L1 processing boards at the NodeB 20.

For example, the L2 scheduler sends a first of the plurality of data sets to the L1 processing board 202-1 for transmission to the user USER1 on carrier C1 in sector S1 (cell CELL1); the L2 scheduler sends a second of the plurality of data sets to the L1 processing board 202-1 for transmission to the user USER1 on carrier C2 in sector S1 (cell CELL2); the L2 scheduler sends a third of the plurality of data sets to the L1 processing board 202-2 for transmission to the user USER1 on carrier C3 in sector S1 (cell CELL3); and the L2 scheduler sends a fourth of the plurality of data sets to the L1 processing board 202-3 for transmission to the user USER1 on carrier C4 in sector S1 (cell CELL4).

The L2 scheduler also divides the downlink control channel information into a plurality of downlink control channel information packets. Each of the plurality of downlink control channel information packets includes downlink control channel information for transmitting data to the user USER1 on one of carriers C1, C2, C3 and C4 in sector S1 (cells CELL1, CELL2, CELL3 and CELL4, respectively). In one example, the downlink control channel information packet may include: cell configuration information; timing information; downlink channel configuration information for a carrier; power setting information; etc. The downlink control channel information packet for anchor cell CELL1 and secondary cell CELL2 is sent to L1 processing board 202-1; the downlink control channel information packet for secondary cell CELL3 is sent to L1 processing board 202-2; and the downlink control channel information packet for secondary cell CELL4 is sent to L1 processing board 202-3.

Figure 7:
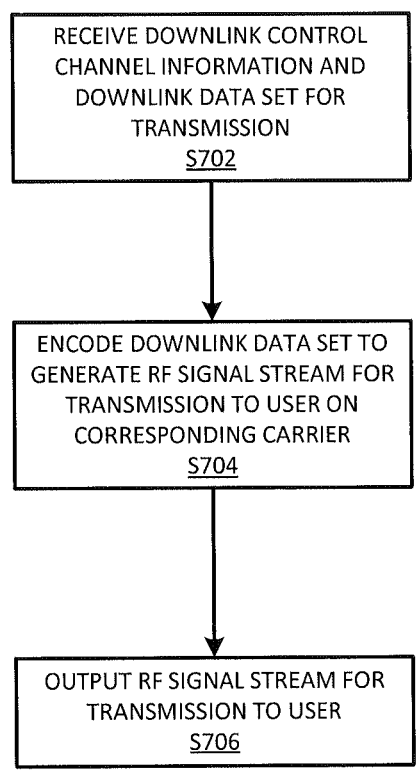
FIG. 7 is a flow chart illustrating a method of processing downlink communications at a L1 processing board in an MBA, according to an example embodiment.

FIG. 7 is a flow chart illustrating an example embodiment of a method of processing downlink communications at the NodeB 20. The example embodiment shown in FIG. 7 illustrates an example of functionality associated with the multi-carrier downlink tasks associated with the multi-carrier downlink communication feature for a multi-carrier user. That is, for example, the method shown in FIG. 7 illustrates functions associated with providing a multi-carrier downlink communication feature for a multi-carrier user in a MBA, according to an example embodiment.

Referring to FIG. 7, at step S702 each L1 processing board receives one or more downlink control channel information packets and downlink data sets for transmission to the user USER1 on a corresponding one of carriers C1, C2, C3 and C4 in sector S1 (cells CELL1, CELL2, CELL3 and CELL4), from the central office 210.

In a more detailed example, at step S702 the L1 processing board 202-1 receives a downlink control channel information packet and a first downlink data set to be transmitted to the user USER1 on carrier C1 in in sector S1 (cell CELL1); the L1 processing board 202-1 receives a downlink control channel information packet and a second downlink data set to be transmitted to the user USER1 on carrier C2 in sector S1 (cell CELL2); the L1 processing board 202-2 receives a downlink control channel information packet and a third downlink data set to be transmitted to the user USER1 on carrier C3 in sector S1 (cell CELL3); and the L1 processing board 202-3 receives a downlink control channel information packet and a fourth downlink data set to be transmitted to the USER1 user on carrier C4 in sector S1 (cell CELL4).

In at least one example embodiment, from among the downlink control channel information and data sets for each carrier, the L1 processing board 202-1 (as well as L1 processing circuit 2020-1) receives only the downlink control channel information and the downlink data sets to be transmitted to the user USER1 on carriers C1 and C2 in sector S1 (cells CELL1 and CELL2); the L1 processing board 202-2 (as well as L1 processing circuit 2020-2) only receives the downlink control channel information and downlink data set to be transmitted to the user USER1 on carrier C3 in sector S1 (cell CELL3); and the L1 processing board 202-3 (as well as L1 processing circuit 2020-3) only receives downlink control channel information and downlink data set to be transmitted to the user USER1 on carrier C4 in sector S1 (cell CELL4).

Returning to FIG. 7, at step S704 each of the L1 processing circuits encodes downlink data bit sequences in the respective received data set into a radio-frequency (RF) signal stream for transmission to the user USER1 on a corresponding one of the carriers C1, C2, C3 and C4 in sector S1 (cells CELL1, CELL2, CELL3 and CELL4, respectively) using the downlink control channel information.

In more detail, the L1 processing board 202-1 encodes downlink data bit sequences in the received first data set into a radio-frequency (RF) signal stream for transmission to the user USER1 on carrier C1 in sector S1 (cell CELL1); the L1 processing board 202-1 encodes downlink data bit sequences in the received second data set into a RF signal stream for transmission to the user USER1 on carrier C2 in sector S1 (cell CELL2); the L1 processing board 202-2 encodes downlink data bit sequences in the received third data set into a RF signal stream for transmission to the user USER1 on carrier C3 in sector S1 (cell CELL3); and the L1 processing board 202-3 encodes downlink data bit sequences in the received fourth data set into a RF signal stream for transmission to the user USER1 on carrier C4 in sector S1 (cell CELL4).

At step S706, each of the L1 processing boards 202-1, 202-2 and 202-3 outputs the generated RF signal streams to corresponding one or more RF antennas for transmission to the user USER1 on a given carrier or carriers in a given cell.

The RF signal streams are then transmitted to the user via the corresponding RF antennas.

According to at least some example embodiments, the L1 processing boards are partitioned to one or more carriers for 3 sectors per L1 processing board. For any single multi-carrier (e.g., 4-carrier) user, the 4 carriers are distributed among the 3 L1 processing boards at the NodeB. A L2 scheduler at a central office performs scheduling functions based on carrier aggregation over the 3 L1 boards. Since the 4 carriers are grouped as a system, the 3 L1 processing boards exchange information with one another. This is different from conventional SBA architectures in which inter-board communication is not used because each board implements all communication features with all information.

The multi-board architecture according to one or more example embodiments may reduce unnecessary resource consumption at a NodeB by decreasing duplicated functionality present in the conventional single board architecture. In one example, the L1 processing boards process only a portion or fraction of the antenna streams as compared to the conventional single board architecture.

Example embodiments may also extend the life cycle of existing boards and provide for the ability to add additional features to existing boards.

As discussed above, the communication features or sets of communication features provided by each of the L1 processing boards at the NodeB 20 may be different. In one example, the L1 processing boards 202-2 and 202-3 may provide interference cancelation for users on carrier C3 in sectors S1 through S3 (cells CELL3, CELL7 and CELL11) and carrier C4 in sectors S1 through S3 (cells CELL4, CELL8 and CELL12).

Figure 8:
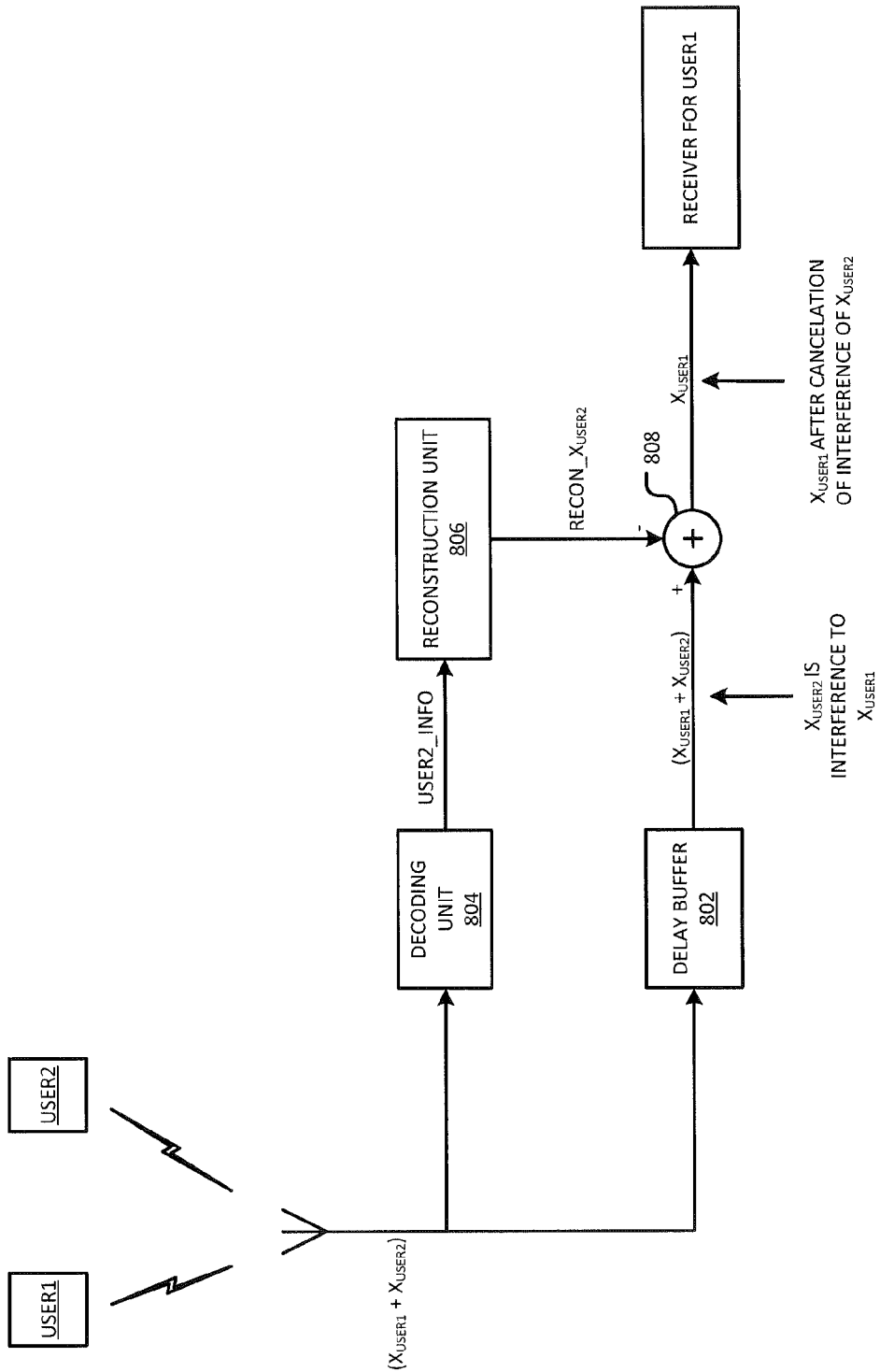
FIG. 8 is a block diagram illustrating an example embodiment of an interference cancelation unit at a L1 processing board.

FIG. 8 is a block diagram illustrating an example embodiment of an interference cancelation unit at one of L1 processing boards 202-2 and 202-3 shown in FIG. 1. For example purposes, the block diagram will be described with regard to canceling interference between users USER1 and USER2 on carrier C3 at L1 processing circuit 202-2 shown in FIG. 1.

According to example embodiments, the interference cancelation unit (and/or one or more components thereof) may be hardware, firmware, hardware executing software or any combination thereof. When the L1 processing circuits are hardware, such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions of the interference cancelation unit (and/or one or more components thereof). CPUs, SOCs, DSPs, ASICs and FPGAs may generally be referred to as processors and/or microprocessors.

Referring to FIG. 8, an RF signal stream received at the L1 processing board 202-2 includes transmissions (RF signal stream portions) from user USER1 and transmissions (RF signal stream portions) from user USER2 mixed or combined together. For the user USER1 receiver, the RF signal stream portion transmitted by user USER2 is interference. The interference cancelation block shown in FIG. 8 detects, decodes and reconstructs the interfering RF signal stream (in this case the RF signal stream portion transmitted by user USER2) and then cancels the interference from the received RF signal stream. In this way, the receiver input for user USER1 is clearer, data recover is easier and less error prone.

In FIG. 8, the total or combined signal ($X_{USER1}+X_{USER2}$) is a combination of the RF signal stream (also referred to as RF signal) $X_{USER1}$ transmitted by user USER1 and the RF signal $X_{USER2}$ transmitted by user USER2.

The decoding unit 804 decodes the combined RF signal $X_{USER1}+X_{USER2}$ to obtain the data bit sequence USER2_INFO transmitted by user USER2 on carrier C3. The decoding unit 804 outputs the data bit sequence USER2_INFO to the reconstruction unit 806.

The reconstruction unit 806 reconstructs or rebuilds the transmitted RF signal stream portion $X_{USER2}$ transmitted by USER2 to obtain the reconstructed RF signal stream $RECON\_X_{USER2}$. In theory (ignoring implementation errors), the reconstructed RF signal stream $RECON\_X_{USER2}$ should be the same or substantially the same as the portion of the combined RF signal stream ($X_{USER1}+X_{USER2}$) transmitted by user USER2 (i.e., $X_{USER2}$ in this example). The reconstruction unit 806 outputs the reconstructed signal $RECON\_X_{USER2}$ to a subtraction unit 808.

Still referring to FIG. 8, while the RF signal stream transmitted by the user USER2 is being decoded and reconstructed, the combined signal ($X_{USER1}+X_{USER2}$) is buffered by a delay buffer 802. After buffering, the delay buffer 802 outputs the combined signal ($X_{USER1}+X_{USER2}$) to the subtraction unit 808.

The subtraction unit 808 cancels the portion of the combined RF signal ($X_{USER1}+X_{USER2}$) transmitted by the user USER2 by subtracting the reconstructed signal $RECON\_X_{USER2}$ from the combined RF signal ($X_{USER1}+X_{USER2}$), thereby obtaining the RF signal stream $X_{USER1}$ transmitted by user USER1 on carrier C3. The RF signal stream $X_{USER1}$ is output to the receiver for user USER1 for further processing (e.g., L1 processing) at the L1 processing board 202-2.

Interference cancelation features such as those discussed above may require relatively significant hardware resources for extra decoding and/or delay buffer. Therefore, loads on the L1 processing boards at the NodeB are balanced by providing interference cancellation functions on the L1 processing boards that process a lesser number of cells (e.g., need only process 3 cells, e.g., L1 processing boards 202-2 and 202-3).

To improve board resource usage, desired load balancing may be achieved by dynamically managing task partitioning and distribution over the multiple L1 processing boards. Some example embodiments provide methods for load balancing of communication feature processing among L1 processing boards. Some example embodiments also provide a NodeB having a multi-board architecture configured such that the L1 processing boards function as a system, thereby enabling dynamic load balancing of communication feature processing at the NodeB.

Example embodiments of methods for load balancing will be described herein with regard to the interference cancelation feature. However, it should be understood that example embodiments may be applied to other user features.

In general, multi-board load balancing may improve resource usage across multiple boards at one or more NodeBs (e.g., a single NodeB). The L1 board resource includes, for example, hardware processing power, available memory size, and timing budget for each user. If one board is over-loaded and another board is under-loaded, some processing tasks may be transferred from the over-loaded board to the under-loaded board to balance the load among the boards. In the MBA according to at least some example embodiments, the load balancing may be controlled dynamically by L2/L3 boards at the central office via control packets sent from the central office to the NodeB.

Figure 4:
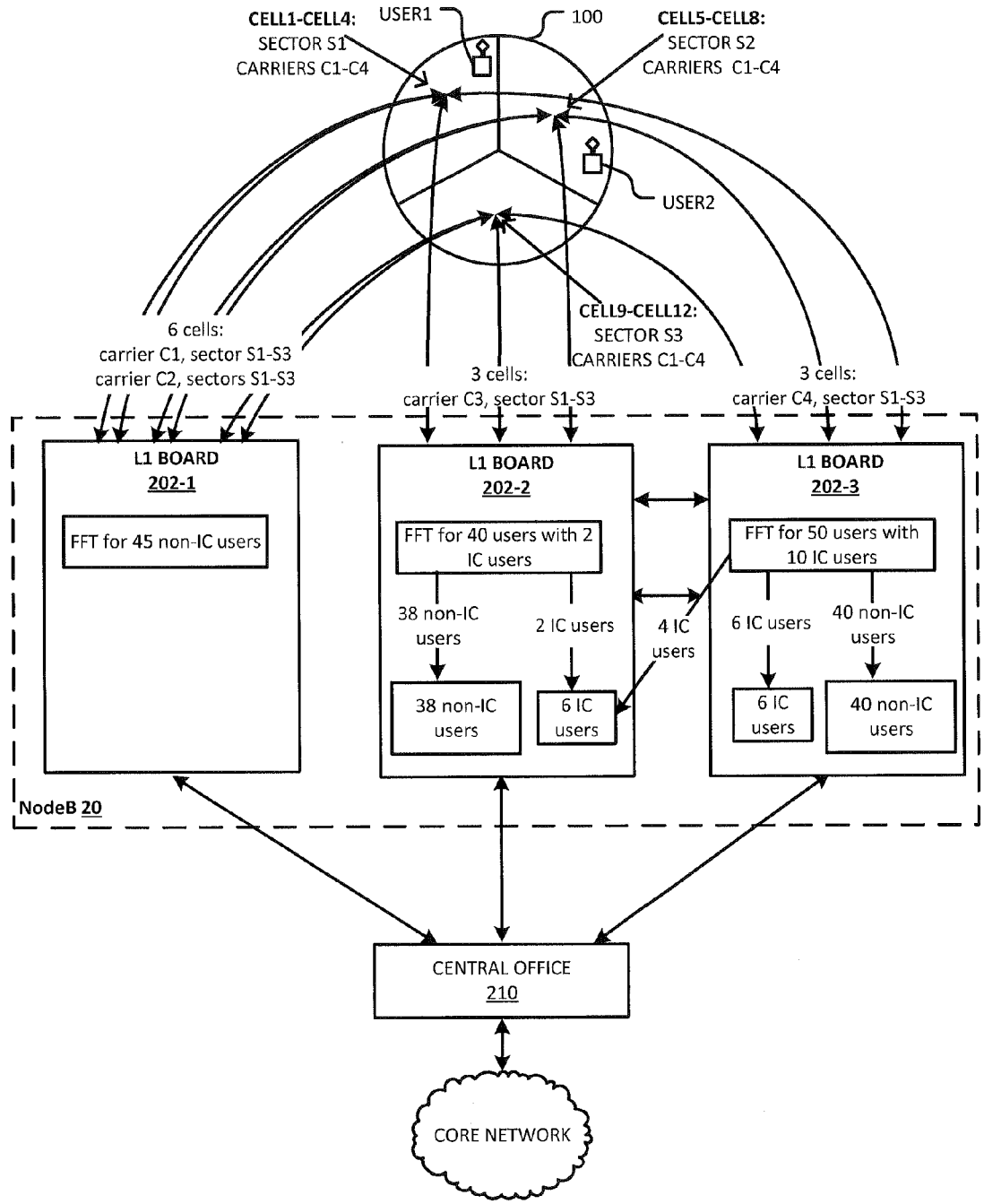
FIG. 4 is a block diagram illustrating an example embodiment of a method for load balancing of a communication feature at the NodeB shown in FIG. 1.

FIG. 4 is a block diagram illustrating an example embodiment of a method for load balancing for the interference cancelation feature at the NodeB 20 shown in FIG. 1. For example purposes, FIG. 4 shows an example of 3GPP LTE carrier aggregation for 2 carriers, with 3 sectors per carrier, among 2 L1 processing boards with load balancing for users.

In a LTE communications network, the fast Fourier transform (FFT) is part of front-end processing for multiple users. In one example, one FFT point represents 15 kHz of frequency bandwidth. A 1024 FFT represents 1024*15 kHz or 15.360 MHz of bandwidth that is shared by multiple users.

In this example, it is assumed that:
i. FFT at L1 processing board 202-1 includes 45 non-IC users since the L1 processing board 202-1 does not perform functions associated with the interference cancelation feature;
ii. FFT at L1 processing board 202-2 includes 40 users in which 2 users are interference cancelation (IC) users and the remaining 38 users are non-IC users;
iii. FFT at L1 processing board 202-3 includes 50 users in which 10 of the users are interference cancelation (IC) users and the remaining 40 users are non-IC users;
iv. An IC user consumes more resource than non-IC user; and
v. Each of L1 processing boards 202-2 and 202-3 has the capacity to process 6 IC users and 50 non-IC users.

Although this example is discussed with regard to each of L1 processing boards 202-2 and 202-3 having the capacity to process 6 IC users and 50 non-IC users, example embodiments should not be limited to this example. Rather, this particular capacity is provided only for the sake of this example.

Using conventional SBA, all users are processed on the local L1 processing board after performing FFT. In this instance, the local L1 processing board 202-3 has 10 IC users, which exceeds the maximum capacity (6 IC users) of the L1 processing board.

By utilizing the MBA according to example embodiments, a L1 processing board may identify a capacity overload for a communication feature at the board, and transfer, from one L1 processing board to another L1 processing board, functions associated with providing the communication feature to at least one user in response to identifying the capacity overload.

In a more specific example, by utilizing the MBA according to example embodiments, IC users, as well as functions associated with providing this communication feature to the users, may be transferred from one L1 processing board to another such that the IC load is distributed and balanced among the L1 processing boards 202-2 and 202-3 at the NodeB 20.

For an IC user, the local L1 processing board receives an antenna stream mixed with multiple users for FFT processing. The FFT output is split into multiple data sets, wherein each data set maps to a corresponding one of the multiple users. The user data set is further processed by a timing and frequency offset compensation processing circuit. After offset compensation, the user data set is sent to an IC processing circuit. Therefore, after offset compensation the user data set is the input to the IC processing circuit, which serves as the information transferred to remote L1 processing board via an L1 interface message.

Referring back to FIG. 4, in this example, since the L1 processing boards 202-2 and 202-3 function as one system (MBA) for the interference cancelation feature, the L1 processing board 202-3 transfers 4 IC-users (after FFT) to the L1 processing board 202-2 for further processing since L1 processing board 202-2 only has 2 IC users. This may be referred to as MBA load balancing for users.

In the example shown in FIG. 4, after the load balancing, the L1 processing board 202-2 has 6 IC-users and L1 processing board 202-3 has 6 IC-users. Accordingly each of the L1 processing boards 202-2 and 202-3 are below the processing capacity of 6 IC users. The L1 processing boards may transfer users and functions associated with providing this communication feature (e.g., interference cancelation) using L1 interface exchange messages.

Figure 9:
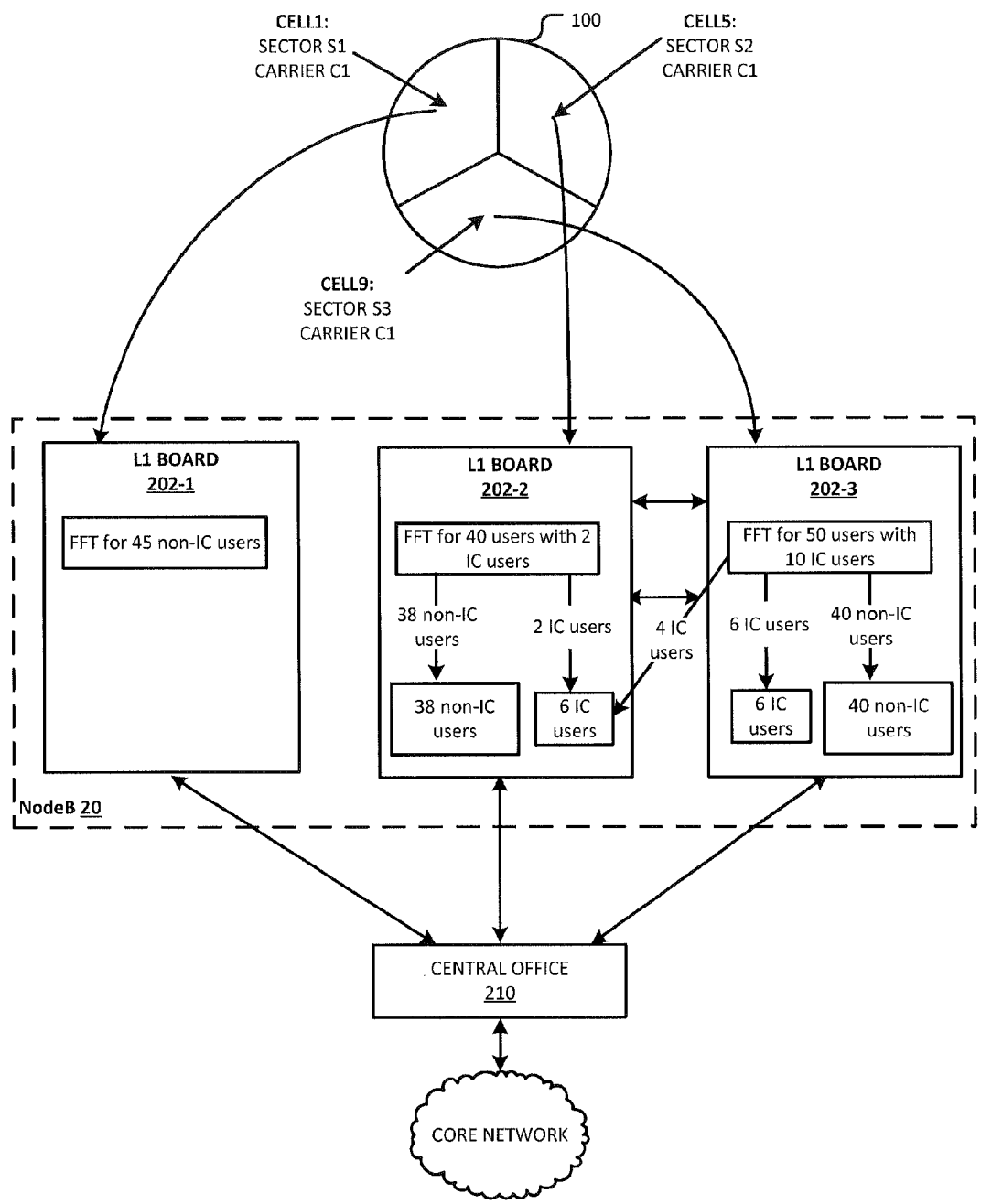
FIG. 9 is a block diagram illustrating another example embodiment of a method for load balancing of a communication feature at the NodeB shown in FIG. 1.

FIG. 9 is a block diagram illustrating an example embodiment of a method for load balancing of a communication feature among boards at a NodeB. For example purposes, an example of LTE carrier aggregation for a single carrier C1, with 3 sectors S1, S2, S3, among 2 L1 processing boards with load balancing for users will be described.

As with the example embodiment shown in FIG. 4, in the example shown in FIG. 9, it is assumed that:
i. FFT at L1 processing board 202-1 includes 45 non-IC users since the L1 processing board 202-1 does not perform functions associated with the interference cancelation feature;
ii. FFT at L1 processing board 202-2 includes 40 users in which 2 users are interference cancelation (IC) users and the remaining 38 users are non-IC users;
iii. FFT at L1 processing board 202-3 includes 50 users in which 10 of the users are interference cancelation (IC) users and the remaining 40 users are non-IC users;
iv. An IC user consumes more resource than non-IC user; and
v. Each of L1 processing boards 202-2 and 202-3 has the capacity to process 6 IC users and 50 non-IC users.

As with FIG. 4, although the example shown in FIG. 9 is discussed with regard to each of L1 processing boards 202-2 and 202-3 having the capacity to process 6 IC users and 50 non-IC users, example embodiments should not be limited to this example. Rather, this particular capacity is provided only for the sake of this example.

By utilizing the MBA according to example embodiments, IC users, as well as functions associated with providing this communication feature to the users, may be transferred from one L1 processing board to another such that the IC load is distributed and balanced among the L1 processing boards 202-2 and 202-3 at the NodeB 20.

In more detail with regard to the example shown in FIG. 9, since the L1 processing boards 202-2 and 202-3 function as one system (MBA) with regard to the interference cancelation feature, the L1 processing board 202-3 transfers the 4 IC-users (after FFT) and functions associated with providing this communication feature to the user to the L1 processing board 202-2 for further processing since L1 processing board 202-2 only has 2 IC users. This may be referred to as MBA load balancing for users.

In the example shown in FIG. 9, after the load balancing, the L1 processing board 202-2 has 6 IC-users and the L1 processing board 202-3 has 6 IC-users. Accordingly each of the L1 processing boards 202-2 and 202-3 are below the processing capacity of 6 IC users. The L1 processing boards may transfer users using L1 interface exchange messages.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A transceiver station providing wireless resources including communication features for users in a geographical coverage area, the geographical coverage area including a plurality of cells, and each of the plurality of cells being associated with a different combination of at least one carrier and at least one sector of the geographical coverage area, the transceiver station comprising:
   a first board including a first L1 processing circuit configured to perform functions associated with providing a first set of the communication features for the users in a first subset of cells from among the plurality of cells; and
   a second board communicatively coupled with the first board, the second board including a second L1 processing circuit configured to perform functions associated with providing a second set of the communication features for the users in a second subset of cells from among the plurality of cells, the first set of the communication features being different from the second set of the communication features;
   wherein the functions associated with providing the first set of the communication features for the users in the first subset of cells from among the plurality of cells include
      processing a received uplink control channel to obtain uplink control channel information for uplink transmissions by a first of the users in the first subset of cells,
      processing, based on the obtained uplink control channel information, a received first uplink data channel to recover first data bit sequences transmitted by the first user in the first subset of cells, and
      outputting the obtained uplink control channel information and recovered first data bit sequences to a central office for further processing.

2. The transceiver station of claim 1, wherein the first L1 processing circuit is further configured to perform functions associated with providing only the first set of the communication features.

3. The transceiver station of claim 2, wherein the second L1 processing circuit is further configured to perform functions associated with providing only the second set of the communication features.

4. The transceiver station of claim 1, wherein:
   the first set of the communication features includes less than all of the communication features provided by the transceiver station; and
   the second set of the communication features includes less than all of the communication features provided by the transceiver station.

5. The transceiver station of claim 1, wherein each communication feature in the first set of the communication features is different from each communication feature in the second set of the communication features.

6. The transceiver station of claim 1, wherein only a portion of the communication features in the first and second sets of the communication features are the same.

7. The transceiver station of claim 1, wherein:
   the first L1 processing circuit is further configured to obtain control information based on a radio-frequency signal stream received on at least a first carrier in the first subset of cells, and to output the obtained control information to the second L1 processing circuit; and
   the second L1 processing circuit is further configured to perform the functions associated with providing the second set of the communication features for the users in the second subset of cells based on the control information from the first L1 processing circuit.

8. The transceiver station of claim 7, wherein the first L1 processing circuit is further configured to output the obtained control information to the second L1 processing circuit via an L1 interface message.

9. The transceiver station of claim 1, wherein:
   the first L1 processing circuit is further configured to output the obtained uplink control channel information to the second L1 processing circuit; and
   the functions associated with providing the second set of the communication features for the users in the second subset of cells from among the plurality of cells include,
      processing, based on the uplink control channel information from the first L1 processing circuit, a received second uplink data channel to recover second data bit sequences transmitted by the first user in the second subset of cells, and
      outputting the recovered second data bit sequences to a central office for further processing.

10. The transceiver station of claim 1, wherein the functions associated with providing the first set of the communication features for the users in the first subset of cells from among the plurality of cells include:
   encoding a received downlink data set to generate a radio-frequency signal stream for transmission to the first of the users on at least a first carrier in the first subset of cells; and
   outputting the generated radio-frequency signal stream for transmission to the first user.

11. The transceiver station of claim 1, wherein:
the first board is configured to identify a capacity overload for at least one communication feature in the first set of communication features for the users; and
transfer, from the first board to the second board, functions associated with providing the at least one communication feature to at least one of the users if the first board identifies the capacity overload for the at least one communication feature at the first board.

12. The transceiver station of claim 11, wherein the second board is configured to perform the transferred functions to provide the at least one communication feature to the at least one of the users.

13. A method for providing wireless resources including communication features for users in a geographical coverage area, the geographical coverage area including a plurality of cells, and each of the plurality of cells being associated with a different combination of at least one carrier and at least one sector of the geographical coverage area, the method comprising:
first performing functions associated with providing a first set of the communication features for the users in a first subset of cells from among the plurality of cells; and
second performing functions associated with providing a second set of the communication features for the users in a second subset of cells from among the plurality of cells, the first set of the communication features being different from the second set of the communication features;
wherein the first performing step includes
processing a received uplink control channel to obtain uplink control channel information for uplink transmissions by a first of the users in the first subset of cells,
processing, based on the obtained uplink control channel information, a received first uplink data channel to recover first data bit sequences transmitted by the first user in the first subset of cells, and
outputting the obtained uplink control channel information and recovered first data bit sequences to a central office for further processing.

14. The method of claim 13, wherein:
the first performing step performs functions associated with providing only the first set of the communication features for the users; and
the second performing step performs functions associated with providing only the second set of the communication features for the users.

15. The method of claim 13, wherein only a portion of the communication features in the first and second sets of the communication features are the same.

16. The method of claim 13, wherein:
the first performing step includes,
obtaining, at a first L1 processing circuit, control information based on a radio-frequency signal stream received on at least a first carrier in the first subset of cells, and
outputting the obtained control information from the first L1 processing circuit to a second L1 processing circuit; and
the second performing step performs, at the second L1 processing circuit, the functions associated with providing the second set of the communication features for the users in the second subset of cells based on the control information from the first L1 processing circuit.

17. The method of claim 13, further comprising:
outputting the obtained uplink control channel information from a first L1 processing circuit to a second L1 processing circuit; and
wherein the second performing step includes,
processing, based on the uplink control channel information from the first L1 processing circuit, a received second uplink data channel to recover second uplink data bit sequences transmitted by the first user in the second subset of cells, and
outputting the recovered second data bit sequences to a central office for further processing.

18. The method of claim 13, wherein the first performing step comprises:
encoding a received downlink data set to generate a radio-frequency signal stream for transmission to the first of the users on at least a first carrier in the first subset of cells; and
outputting the generated radio-frequency signal stream for transmission to the first user.

* * * * *